(12) United States Patent
Debert et al.

(10) Patent No.: US 7,909,083 B2
(45) Date of Patent: Mar. 22, 2011

(54) METHOD OF FASTENING A FLEXIBLE SHEET-LIKE STRUCTURE ON A WINDING SHAFT, AND ROLLER BLIND

(75) Inventors: Dieter Debert, Stuttgart (DE); Marina Ehrenberger, Ebersbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 225 days.

(21) Appl. No.: 12/074,315

(22) Filed: Mar. 3, 2008

(65) Prior Publication Data

US 2008/0210389 A1 Sep. 4, 2008

(30) Foreign Application Priority Data

Mar. 2, 2007 (DE) .................. 10 2007 011 608

(51) Int. Cl.
*A47G 5/02* (2006.01)
(52) U.S. Cl. .. 160/238; 160/401; 160/402; 160/DIG. 15
(58) Field of Classification Search ........... 160/DIG. 15, 160/393, 396, 399, 401, 402, 238, 324, 325, 160/326, 323.1; 242/587.1, 587.2, 586.2, 242/586.3, 584, 585, 587.3
See application file for complete search history.

(56) References Cited

U.S. PATENT DOCUMENTS

| | | | | |
|---|---|---|---|---|
| 1,287,135 A * | 12/1918 | Swanson | ......................... | 160/28 |
| 1,459,772 A * | 6/1923 | Kirsch | ......................... | 160/399 |
| 1,734,769 A * | 11/1929 | Hadden | ......................... | 160/387 |
| 1,747,081 A | 2/1930 | Reukauf, Jr. | | |
| 1,834,669 A * | 12/1931 | Yeates | ......................... | 160/263 |
| 3,228,455 A * | 1/1966 | Jacobson | ......................... | 160/24 |
| 3,329,195 A * | 7/1967 | Kochanowski | ................. | 160/24 |
| 3,724,524 A * | 4/1973 | Potter | ......................... | 160/24 |
| 2007/0235580 A1* | 10/2007 | Hernandez et al. | ......... | 242/587.2 |
| 2008/0210389 A1* | 9/2008 | Debert | ......................... | 160/238 |

FOREIGN PATENT DOCUMENTS

GB 223641 10/1924
GB 1 483 278 8/1977

* cited by examiner

*Primary Examiner* — Blair M. Johnson
(74) *Attorney, Agent, or Firm* — Flynn, Thiel, Boutell & Tanis, P.C.

(57) ABSTRACT

A method of fastening a flexible sheet-like structure on a tubular winding shaft including: introducing, in a circumference of the tubular winding shaft, at least one aperture which passes through a wall of the winding shaft, a width of the aperture being greater than the thickness of the flexible sheet-like structure, cutting into the flexible sheet-like structure to produce at least one angleable tab, and inserting the tab into the aperture of the winding shaft. Additionally, a roller blind includes a winding shaft and a flexible sheet-like structure fastened thereon.

11 Claims, 7 Drawing Sheets

METHOD OF FASTENING A FLEXIBLE SHEET-LIKE STRUCTURE ON A WINDING SHAFT, AND ROLLER BLIND

FIELD OF THE INVENTION

The invention relates to a method of fastening a flexible sheet-like structure on a tubular winding shaft. The invention also relates to a roller blind having a winding shaft and a sheet-like structure fastened thereon.

BACKGROUND OF THE INVENTION

Roller blinds are used in a variety of ways in motor vehicles and/or in other application areas. For example, roller blinds are used in vehicles to secure baggage, as a screen, as a sunshade or the like. Roller blinds comprise, in principle, a tubular winding shaft on which a flexible sheet-like structure, for example a canvas or a netting material, is fastened such that it can be wound up and unwound.

In order to produce a roller blind, it is usually the case that first all the desired size of flexible sheet-like structure or roller-blind web is cut out of the desired material. The roller-blind web is usually cut such that lateral tabs, which project beyond lateral peripheries determining the width of the roller-blind web, remain at a rear end of the roller-blind web, by which the roller-blind web is fastened on the winding shaft. The tabs give rise, for example, to a T-shaped roller-blind web. For fastening the roller-blind web on the winding shaft, the end of the roller-blind web is adhesively bonded to the winding shaft, the tabs projecting laterally beyond the peripheries being folded over and inserted into the winding shaft from the ends of the latter. The act of inserting the tabs into the interior of the tubular winding shaft allows good, secure fastening. In order to form such tabs, however, it is first of all necessary to provide a material with a width which corresponds to the width of the roller-blind web plus the width of the two lateral tabs. With the exception of the tabs, the excess material is removed, in a further step, from the lateral peripheries of the roller-blind web. Production of such a roller blind thus results in a lot of material of the sheet-like structure being wasted.

It is an object of the invention to provide a method of fastening a flexible sheet-like structure on a winding shaft in which waste is reduced. It is a further object of the invention to provide a corresponding roller blind.

This object is achieved by a method of fastening a flexible sheet-like structure, in particular a canvas, on a tubular, in particular hollow-cylindrical, winding shaft, comprising the following steps: introducing, in a circumference of the tubular winding shaft, at least one aperture which passes through a wall of the winding shaft, a width of the aperture being greater than a thickness of the flexible sheet-like structure; producing an angleable tab on the flexible sheet-like structure, and inserting the angled tab into the at least one aperture on the winding shaft. The flexible sheet-like structure is usually rectangular with a longitudinal direction along which it can be wound up and unwound, also referred to as the winding-up direction, and a transverse direction. The width of the flexible sheet-like structure, i.e. the extent in the transverse direction, is usually essentially equal to the length of the winding shaft in its axial direction, it being possible for the winding shaft to project beyond the flexible sheet-like structure in the axial direction of the winding shaft for better handling. Introduction according to the invention of apertures on the circumference of the winding shaft makes it possible to insert tabs at a location other than the open ends of the winding shaft, for fastening in the winding shaft. The sheet-like structure has preferably already been cut to a normal size which is appropriate for the function of the roller blind. The sheet-like structure may additionally be adhesively bonded to the winding shaft. Fitting by means of tabs can prevent rotation and/or displacement of the canvas relative to the winding shaft even if additional adhesive bonding should fail and/or if there is no additional adhesive bonding provided. The tab can be produced at a corner of the flexible sheet-like structure by folding.

In a further configuration, the flexible sheet-like structure is fixed on the winding shaft by a bushing, in particular a bearing bushing, which can be inserted into the end of the winding shaft. An inserted bushing can cover the tab inserted into the winding shaft, in which case the bushing clamps the tab firmly in place on an inner wall of the winding shaft. In one embodiment, the bushing is a bearing bushing and thus serves for bearing the winding shaft and for fastening the flexible sheet-like structure on the winding shaft. Instead of the bearing bushing, however, it is also possible to use a latching bushing, in which case a separate element serves for bearing the shaft.

In a further configuration, the tab is produced by cutting into- a flexible sheet-like structure and/or by deformation at a lateral periphery and/or an end edge of the flexible sheet-like structure. The sheet-like structure has preferably already been cut to a normal size which is appropriate for the function of the roller blind. According to the invention, the cutting or angling operation for forming the tab give rise to only minimal waste, if any at all. In other configurations, however, it may be advantageous if the tab projects longitudinally and/or transversely beyond the normal, functionally appropriate size of a roller-blind web. Fastening according to the invention likewise makes it possible at least to reduce waste.

In a development of the method, the at least one aperture is designed as a slot in the circumferential direction with an arc length which is smaller than the circumference of the tubular winding shaft, and produced on the flexible sheet-like structure, by a cut in the transverse direction of the flexible sheet-like structure, is at least one tab which corresponds to the slot and has a length which, at most, is equal to the arc length. In a preferred configuration of the invention, the cut in the transverse direction is started at a lateral periphery of the flexible sheet-like structure. One cut can thus produce a tab which can be angled at any desired angle for fastening purposes. If the cut, in contrast, is formed in the sheet-like structure at a distance from a lateral periphery, then deformation of the flexible sheet-like structure which is necessary for angling the tab can be simplified by further cuts.

In one exemplary embodiment, the at least one slot is introduced in the circumferential direction at a distance from one end of the winding shaft, a width of the tab being approximately equal to the distance of the slot from the end of the winding shaft. It is possible here for a flexible sheet-like structure, of which the width corresponds to the length of the winding shaft in the axial direction, to be fitted on the winding shaft without any waste. In one configuration, the width of the tab, by an appropriate cut, may also be selected to be greater than the distance of the slot from the end of the winding shaft, the tab not being inserted into the slot on the winding shaft over the entire width. The slot is preferably introduced in the circumferential direction at a distance from the end of the winding shaft which is smaller than a length of a bushing which can be inserted into the end of the winding shaft, the distance corresponding, in particular, approximately to a quarter to three quarters of the length, preferably approximately half the length.

In a development of the method, at least one tab is produced on the flexible sheet-like structure by the first cut in the transverse direction, and a second cut, which crosses the first cut in the longitudinal direction, of the flexible sheet-like structure. The second cut here is preferably introduced from an end edge which can be fastened on the winding shaft. In other configurations, a third cut is introduced in order for a tab which can be angled at right angles to be produced by three cuts arranged in a U-shaped manner.

In a development of the method, the aperture is produced as a cutout which is open toward the end of the winding shaft. Such a cutout allows particularly straightforward insertion of the tab. The arc length of the cutout here should be selected such that the winding shaft is not overly weakened by the cutout.

In a development of the invention, the aperture is produced as an essentially U-shaped and/or V-shaped cutout. A corresponding tab on the sheet-like structure can be produced by one or two slots, it being possible for the tab, for fastening purposes, to be clamped beneath the nose formed by the V-shaped or U-shaped aperture.

In a development of the method, the at least one aperture is introduced into the winding shaft at at least one end as a slot in the axial direction, a tab which corresponds to the slot being produced in the flexible sheet-like structure. In one configuration, the tab is produced by at least one cut in the longitudinal direction of the flexible sheet-like structure. In one configuration of the invention, the cut in the longitudinal direction terminates at the end edge of the flexible sheet-like structure. One cut thus produces a tab which can be angled at any desired angle and can be inserted into a correspondingly oriented slot of the winding shaft. In other configurations, the longitudinal cut is produced at a distance from the edge, this producing an angleable tab which can be pushed, for example, onto a corresponding nose on the winding shaft.

In one embodiment of the method, the flexible sheet-like structure is adhesively bonded to the winding shaft. Adhesive bonding here can take place both on the tabs and in regions between the tabs.

In a development of the method, the bushing has a latching nose which, when the bushing is pushed into the winding shaft, is pushed over the tab inserted into the aperture.

The object is also achieved by a roller blind, in particular a roller blind for fitting in a motor vehicle, comprising a tubular winding shaft and a sheet-like structure which is fastened thereon such that it can be wound up and unwound, wherein the winding shaft has at least one aperture which penetrates a wall and has a width which is greater than a thickness of the flexible sheet-like structure, and the flexible sheet-like structure has at least one angleable tab which, for connection of the flexible sheet-like structure to the winding shaft, is inserted into the interior of the winding shaft via the aperture. Insertion of the sheet-like structure into the winding shaft allows the sheet-like structure to be fastened on the winding shaft in the interior of the latter, for example to be adhesively bonded and/or clamped to the same, preferably by way of a bushing.

Further advantages of the invention can be gathered from the following description of exemplary embodiments of the invention which are illustrated schematically in the drawings. The same or similar components are indicated in the drawings by like designations. All the features and/or advantages, including design details, spatial arrangements and method steps, which can be gathered from the claims, the description or the drawings may be essential to the invention both on their own and in a wide variety of different combinations. Features which are illustrated or described as part of an exemplary embodiment can likewise be used in another exemplary embodiment in order to obtain a further embodiment of the invention.

BRIEF DESCRIPTION OF THE DRAWINGS

In the drawings:

FIG. 1b shows a flexible sheet-like structure for the winding shaft according to FIG. 1a;

FIG. 2b shows a flexible sheet-like structure for the winding shaft according to FIG. 2a;

FIG. 3b shows a flexible sheet-like structure for the winding shaft according to FIG. 3a;

FIG. 4b shows a flexible sheet-like structure for the winding shaft according to FIG. 4a;

FIG. 6b shows a flexible sheet-like structure for the winding shaft according to FIG. 6a;

DETAILED DESCRIPTION

Figure 1A:
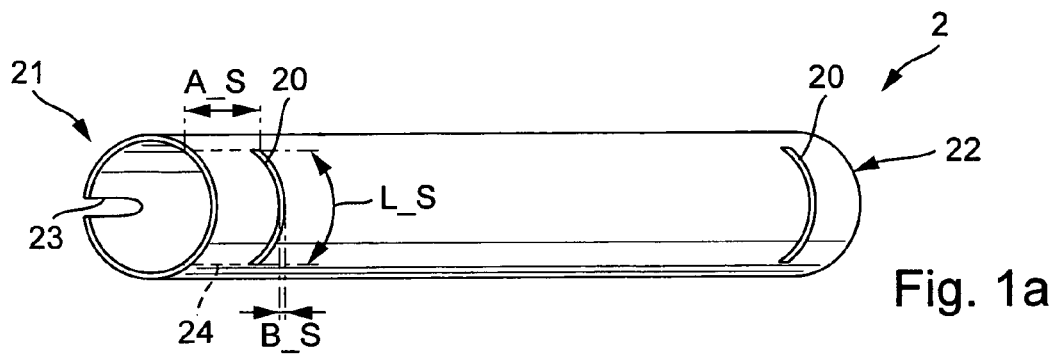
FIG. 1a shows a winding shaft for a roller blind according to a first exemplary embodiment of the invention.
Figure 1B:
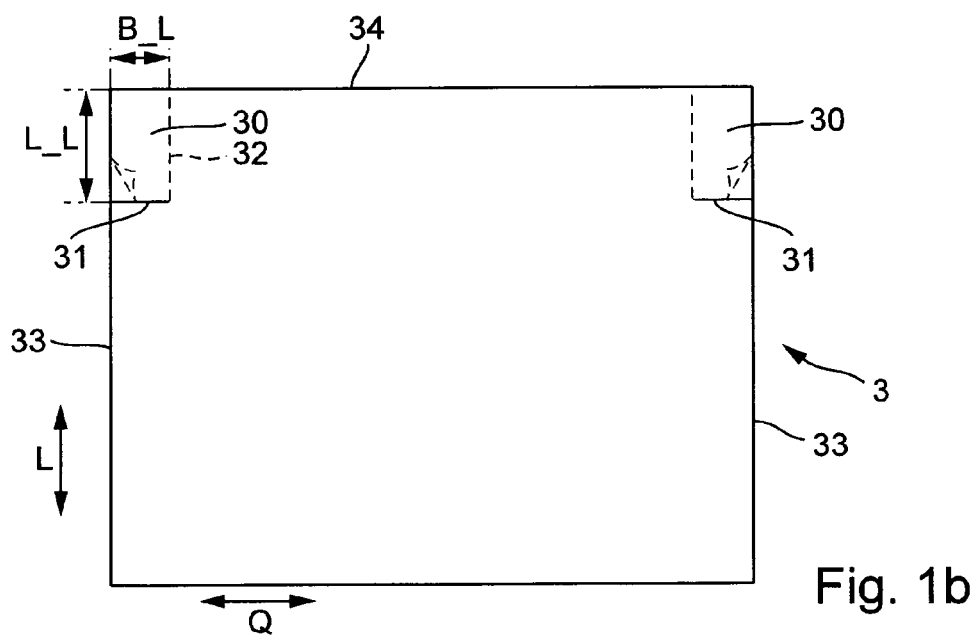
Figure 1C:
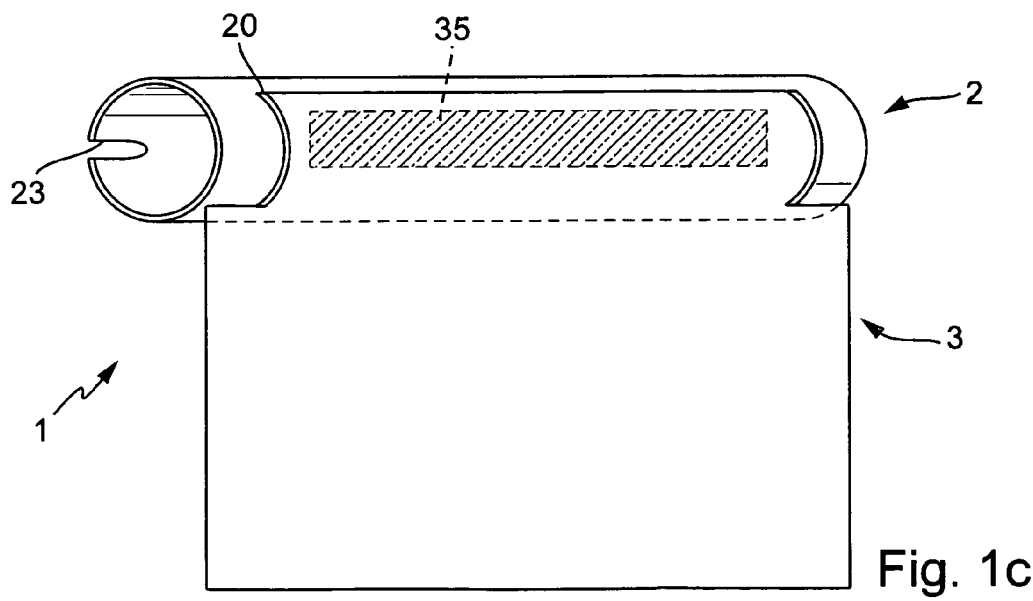
FIG. 1c shows a roller blind comprising a winding shaft according to FIG. 1a and a flexible sheet-like structure according to FIG. 1b fitted thereon.

FIGS. 1a to 1c show, schematically, a first exemplary embodiment of the invention. FIG. 1c here shows a roller blind 1 comprising a winding shaft 2 and a flexible sheet-like structure 3, in particular a canvas, fastened thereon. FIG. 1a shows, schematically, a perspective illustration of the winding shaft 2 and FIG. 1b shows, schematically, a plan view of the sheet-like structure 3.

As can best be seen in FIG. 1a, two slots 20 are formed in a circumference of the winding shaft 2. The slots 20 each extend with an arc length L_S in the circumferential direction. The slots 20 are formed at the two ends 21, 22 of the tubular winding shaft 2 in each case at a distance A_S from the associated end 21, 22. If the winding shaft 2 has a regular periphery at the ends 21, 22 as illustrated, then the distance A_S is constant. In the case of an irregular periphery (not illustrated), it is necessary to define corresponding reference points for the distance A_S.

The winding shaft 2 illustrated also has a groove 23 by means of which it is possible to center a bearing bushing (not illustrated), which can be inserted into one end 21, 22 of the winding shaft 2.

As can be seen in FIG. 1*b*, the flexible sheet-like structure 3 has two tabs 30. In order to form the tabs 30 cuts 31 are cut into the flexible sheet-like structure 3 in the transverse direction Q at lateral peripheries 33. The tabs 30 can be angled in each case about folding lines 32, which run, as illustrated, parallel to a longitudinal direction L or at an angle thereto, in relation to that plane of the sheet-like structure 3 which coincides with the plane of the drawing. Angling of the tabs about the folding lines 32 is indicated by dashed lines in FIG. 1*b*.

The angled tabs 30—as is illustrated in FIG. 1*c*—can be inserted into the slots 20 of the winding shaft 2. The width B_S of the slots 20, for this purpose, is greater than a thickness of the sheet-like structure 3 extending perpendicularly to the plane of the drawing according to FIG. 1*b*. The width B_S may be adapted to the stiffness of the flexible sheet-like structure 3 and thus to the deformability for insertion into the slot 20. In one embodiment, the tabs 30 inserted may be adhesively bonded and/or clamped to the winding shaft 2 in the interior of the latter. For clamping of the sheet-like structure, use may be made for example, of bearing bushings (not illustrated) inserted into the ends 21, 22 of the winding shaft 2.

In order that the tabs 30 according to FIG. 1*b* can be plugged into the slots 20 of the winding shaft 2, a length L_L of the tab 30 in the longitudinal direction, at most, is equal to the arc length L_S of the slot 20. In other configurations which are not illustrated, however, it is also conceivable for tabs to project longitudinally beyond the sheet-like structure at an end edge, in which case a U-shaped end is produced. Production of such a sheet-like structure, however, results in waste remaining. A width B_L of the tab 30 preferably corresponds to the distance A_S of the slots 20 from the respective ends 21, 22. In order to improve fastening of the flexible sheet-like structure 3 on the winding shaft 2, in the exemplary embodiment illustrated an adhesive is applied to an underside of the sheet-like structure 3, in a region of contact 35 with the winding shaft 2.

In a variation of the first exemplary embodiment, a cutout 24 which extends up to the end 21 of the winding shaft 2 is introduced into the winding shaft 2, as is indicated schematically by a dashed line. Using a cutout 24 instead of a slot 20 simplifies the insertion of the tab 30 into the interior of the winding shaft 2.

Figure 2A:
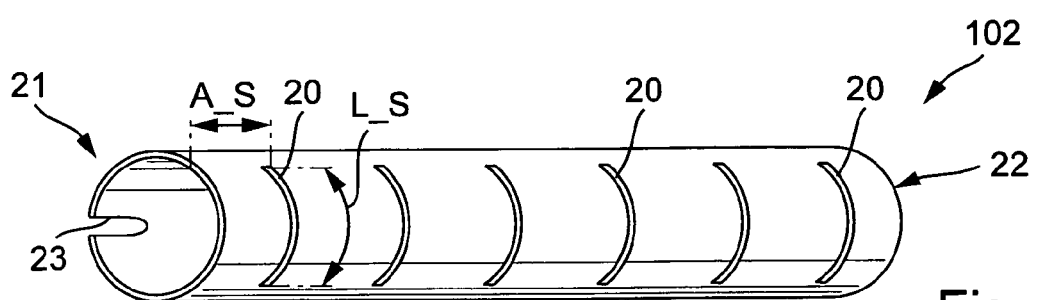
FIG. 2a shows a winding shaft for a roller blind according to a second exemplary embodiment of the invention.

FIG. 2*a* shows, schematically, a winding shaft 102 for a roller blind according to a second exemplary embodiment of the invention. Six slots 20 each extending with an arc length L_S in the circumferential direction, are introduced into the winding shaft 102. In other configurations of the invention, more than six or fewer than six slots 20 can be made in the winding shaft 102, for example by cutting into the winding shaft 102.

Figure 2B:
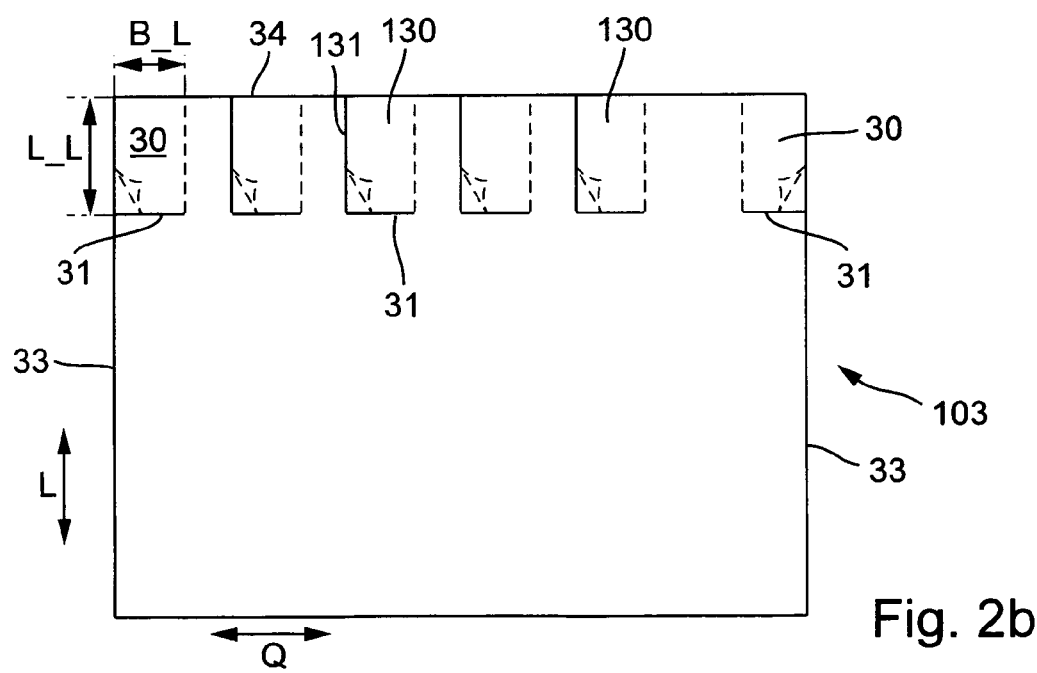

FIG. 2*b* shows a flexible sheet-like structure 103 which can be fastened on the winding shaft 102 according to FIG. 2*a*. Six tabs 30, 130 are formed on the flexible sheet-like structure 103. The two outer tabs 30 here are formed in each case by a cut 31 in the transverse direction Q of the flexible sheet-like structure 103 at the lateral peripheries 33. For the central tabs 130, in addition to the cuts 31 in the transverse direction Q, cuts 131 are cut into the flexible sheet-like structure 103 in the longitudinal direction L of the flexible sheet-like structure 103 from the end edge 34. The tabs 30, 130 can be angled from the flexible sheet-like structure 103. Angled tabs 30, 130 can be inserted into the slots 20 of the winding shaft 102 according to FIG. 2*a*, in which case the flexible sheet-like structure 103 can be connected to the winding shaft 102 in the interior of the latter. Fastening of the flexible sheet-like structure 103 on the winding shaft 102 can be improved by an adhesive layer or the like. In another configuration of the invention, the longitudinal cuts 131 are spaced apart from the end edge 34. Using a further cut in the transverse direction means that a tab which can be angled at any desired angle can likewise be produced by three cuts arranged in U-shaped manner.

Figure 3A:
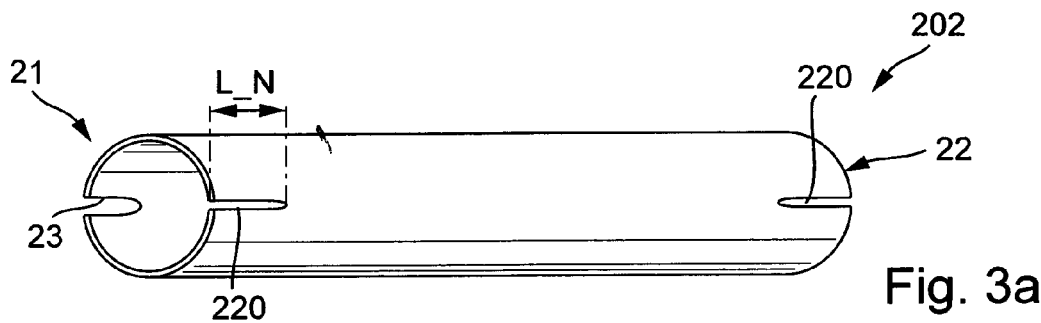
FIG. 3a shows a winding shaft for a roller blind according to a third exemplary embodiment of the invention.
Figure 3B:
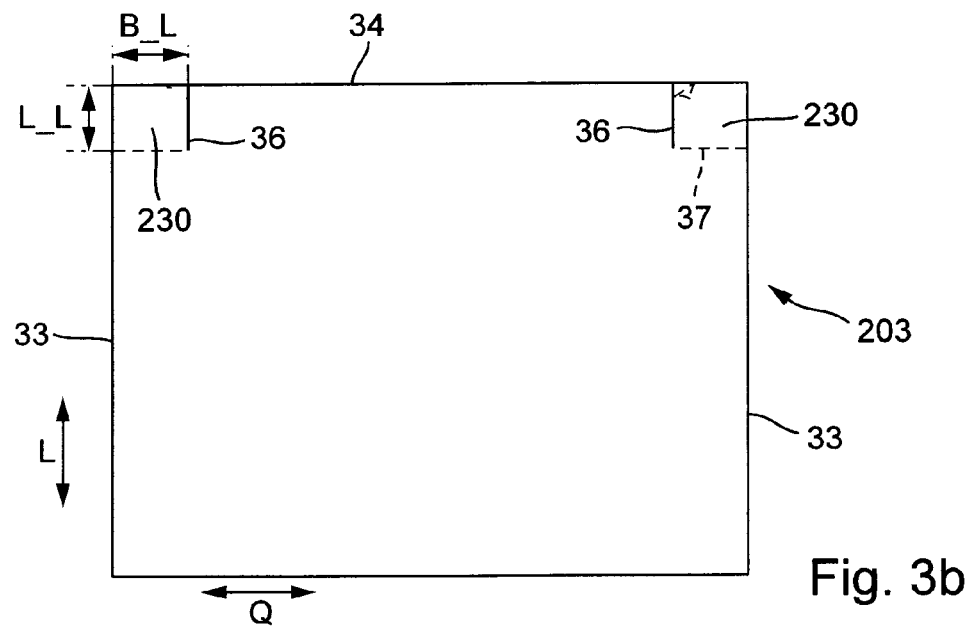
Figure 3C:
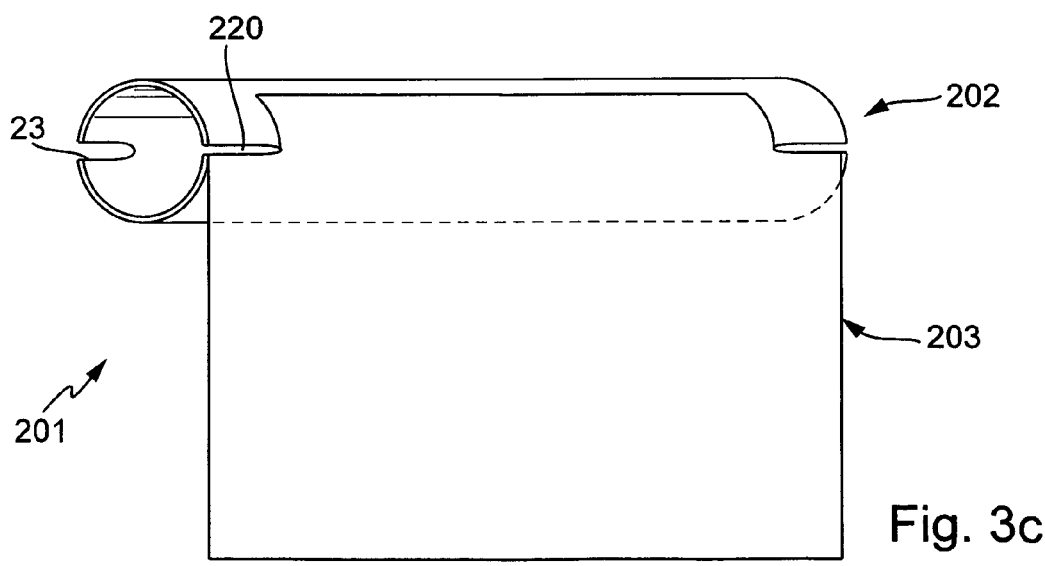
FIG. 3c shows a roller blind comprising a winding shaft according to FIG. 3a and a flexible sheet-like structure according to FIG. 3b fitted thereon.

FIGS. 3*a* to 3*c* show a winding shaft 202 and a flexible sheet-like structure 203 for a roller blind 201 according to a third exemplary embodiment of the invention. The components here essentially correspond to the components according to FIGS. 1*a* to 1*c*, and like elements are indicated by like designations. For fastening the flexible sheet-like structure 203 on the winding shaft 202, slots 220 are introduced into the ends 21, 22 of the winding shaft 202 in the axial direction of the winding shaft 202. The slots 220 in the axial direction or axial grooves, have a length L_N. As can best be seen in FIG. 3*b*, tabs 230 are formed at the lateral peripheries 33 of the flexible sheet-like structure 203 at an end edge 34 which is to be fastened on the winding shaft 202. The tabs 230 are formed by cuts 36 in the longitudinal direction L of the flexible sheet-like structure 203, the cuts 36 illustrated terminating at the end edge 34 of the flexible sheet-like structure 203. The tabs 230 have a width B_L and length L_L, the width B_L corresponding essentially to a length L_N of the axial slots 220 according to FIG. 3*a*. The tabs 230 can be angled from the flexible sheet-like structure 203 about folding lines 37 running parallel to the transverse direction Q, it being possible for the angled tabs 230, as illustrated in FIG. 3*c* to be inserted into the slots 220 and for the flexible sheet-like structure 203 to be fastened on the winding shaft 202 according to FIG. 3*c* in order to produce the roller blind 201. The tabs 230 inserted can be adhesively bonded, clamped or connected in some other manner to the winding shaft 202 in the interior of the latter.

Figure 4A:
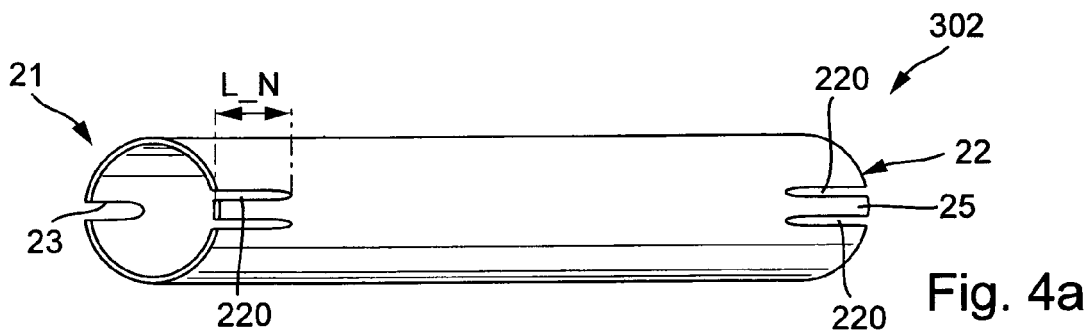
FIG. 4a shows a winding shaft for a roller blind according to a fourth exemplary embodiment of the invention.
Figure 4B:
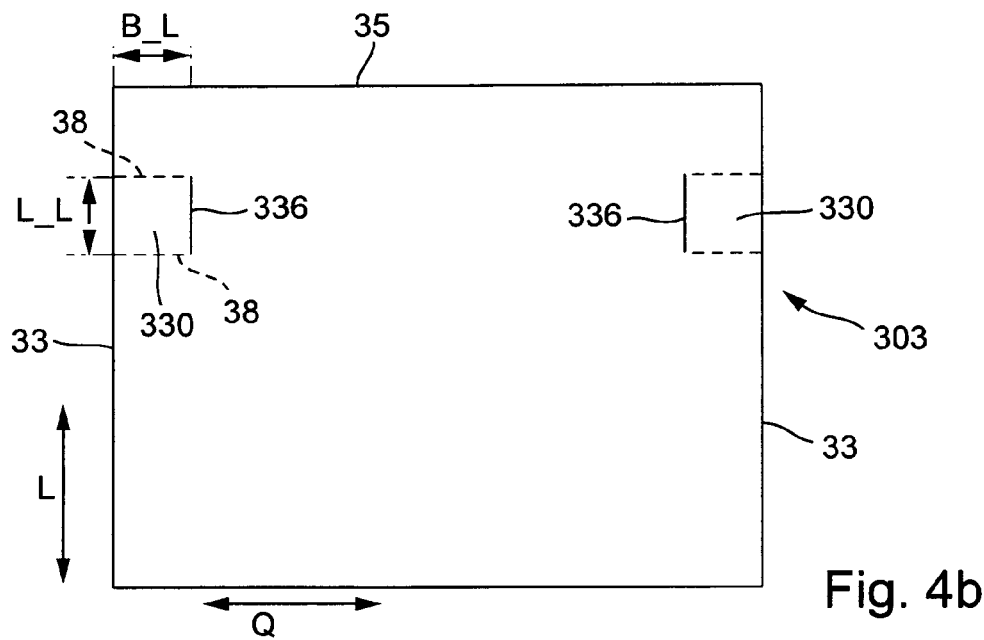
Figure 4C:
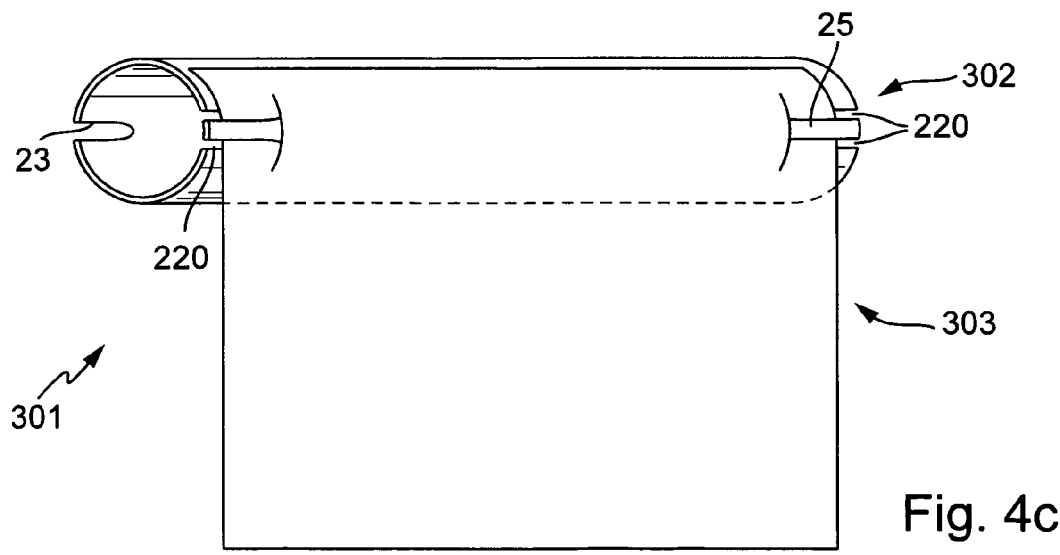
FIG. 4c shows a roller blind comprising a winding shaft according to FIG. 4a and a flexible sheet-like structure according to FIG. 4b fitted thereon.

FIGS. 4*a* to 4*c* show schematically, a winding shaft 302 and a flexible sheet-like structure 303 for a roller blind 301 according to a fourth exemplary embodiment of the invention. The components here correspond essentially to the components according to FIGS. 3*a* to 3*c*, and like elements are indicated by like designations.

In each case two slots 220 are formed in the axial direction at the ends 21, 22 of the winding shaft 302 according to FIGS. 4*a* and 4*c*, the axial slots 220 each having the length L_N. A respective nose 25 is formed at each end 21, 22 by the slots 220. In order to fasten the flexible sheet-like structure. 303 according to FIGS. 4*b* and 4*c* on the winding shaft 302, tabs 330 with a length L_L and a width B_L are formed in the flexible sheet-like structure 303. The tabs 330 are formed in each case by a cut 336 in the longitudinal direction L parallel to the lateral peripheries 33, and at a distance B_L therefrom. Deformation of the flexible sheet-like structure 303 means that the tabs 330 can be angled about folding lines 38, parallel to the transverse direction Q, from a plane of the flexible sheet-like structure 303 which coincides with the plane of the drawing according to FIG. 3*b*. For fastening the flexible sheet-like structure 303 on the winding shaft 302, as is illustrated in FIG. 4*c*, the angled tabs 330 can be pushed into the axial slots 220 beneath the nose 25. For fastening at the two ends here, use can be made for example, of elasticity of the flexible sheet-like structure 303 and/or deformability of the noses 25. In other configurations, such fastening is provided only at one of the ends 21, 22 of the winding shaft 402.

Figure 5A:
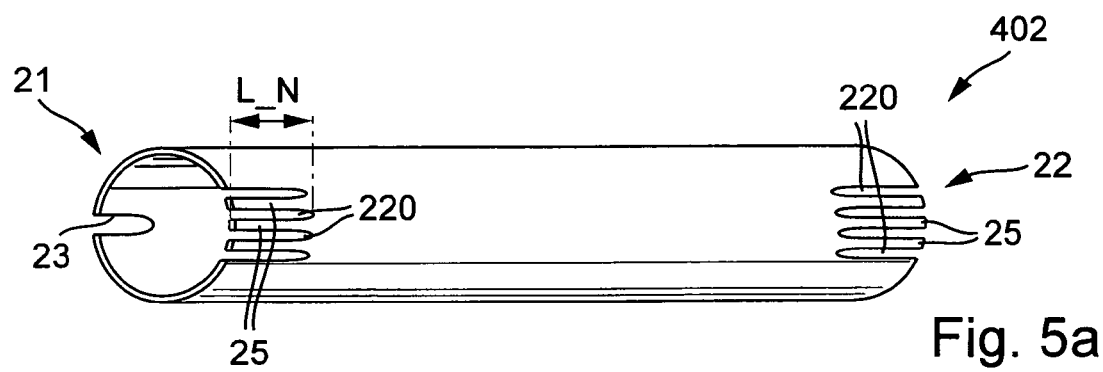
FIG. 5a shows a winding shaft for a roller blind according to a fifth exemplary embodiment of the invention.
Figure 5B:
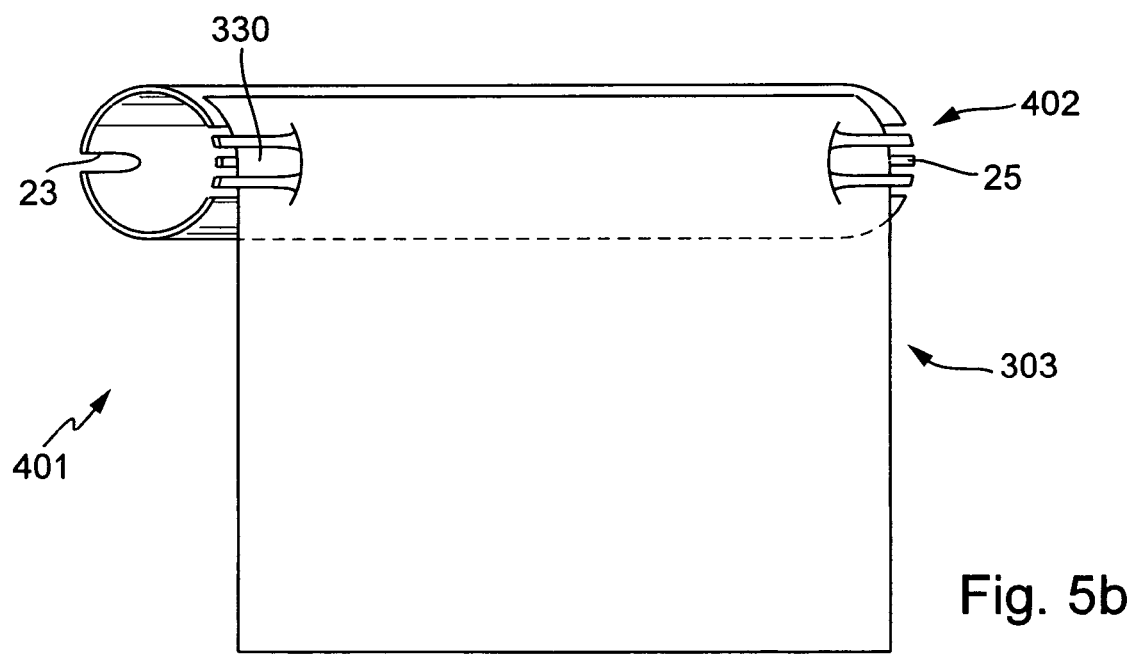
FIG. 5b shows a roller blind comprising a winding shaft according to FIG. 5a and a flexible sheet-like structure according to FIG. 4b fitted thereon.

FIGS. 5a and 5b show a winding shaft 402 and the flexible sheet-like structure 303 according to FIG. 4b for a roller blind 401 according to a fifth exemplary embodiment of the invention. The exemplary embodiment corresponds essentially to the exemplary embodiment according to FIGS. 4a to 4c, and like elements are indicated by like designations.

As can be seen in FIGS. 5a and 5b, in each case four slots 220 are formed at the ends 21, 22 of the winding shaft 402, each slot extending in the axial direction of the winding shaft 402 and having a length L_N. The four slots 220 result in three noses 25 being formed at each of the ends. A flexible sheet-like structure 303 according to FIG. 4b can be fastened on the winding shaft 402, as is illustrated in FIG. 5b, the tab 330 being intertwined with the noses 25 of the winding shaft 402, as is illustrated in FIG. 5b. In order to provide for a fastening of the flexible sheet-like structure 303 at the two ends 21, 22 of the winding shaft 402, it is likewise possible to make use of elasticity of the flexible sheet-like structure 303. In other configurations of the invention, the various fastening methods are combined with one another and/or the flexible sheet-like structure is intertwined with the winding shaft just at one lateral periphery.

Figure 6A:
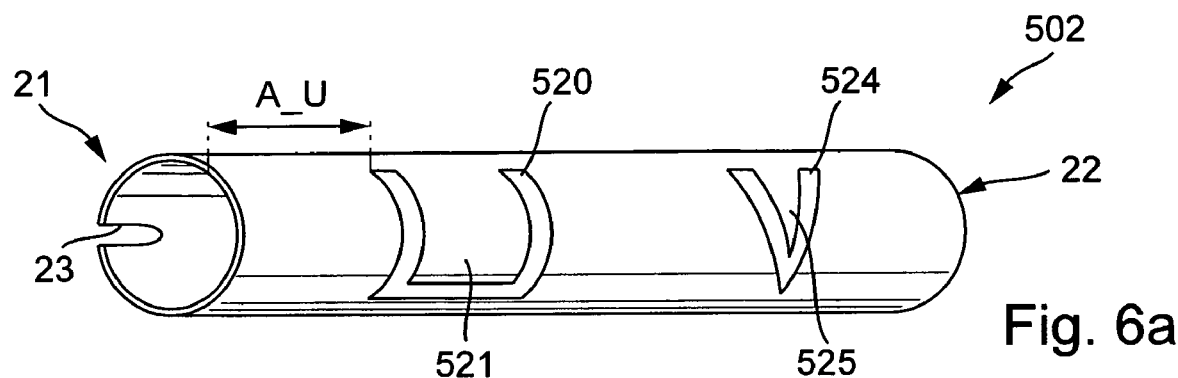
FIG. 6a shows a winding shaft for a roller blind according to a sixth exemplary embodiment of the invention.

FIG. 6a shows a winding shaft 502 for a roller blind according to a sixth exemplary embodiment of the invention. Elements of the winding shaft 502 which correspond to the winding shaft 2 according to FIG. 1a are indicated by like designations, and a detailed description of these elements is dispensed with. The winding shaft 502 illustrated has an essentially U-shaped aperture 520, which forms a first nose 521, and an essentially V-shaped aperture 524, which forms a further nose 525. The apertures 520, 524 illustrated are merely by way of example. It is, of course, likewise conceivable to have winding shafts which have two or more U-shaped apertures 520 and/or two or more V-shaped apertures 524 and/or modifications thereof. It is also conceivable to have winding shafts which have just one U-shaped or V-shaped aperture, although two or more apertures which are spaced apart from one another in the axial direction of the winding shaft are advantageous for better rotation prevention. The apertures 520, 524 can be introduced into the tubular winding shaft 502 at any desired distance A_U from the ends 21, 22 of the same.

Figure 6B:
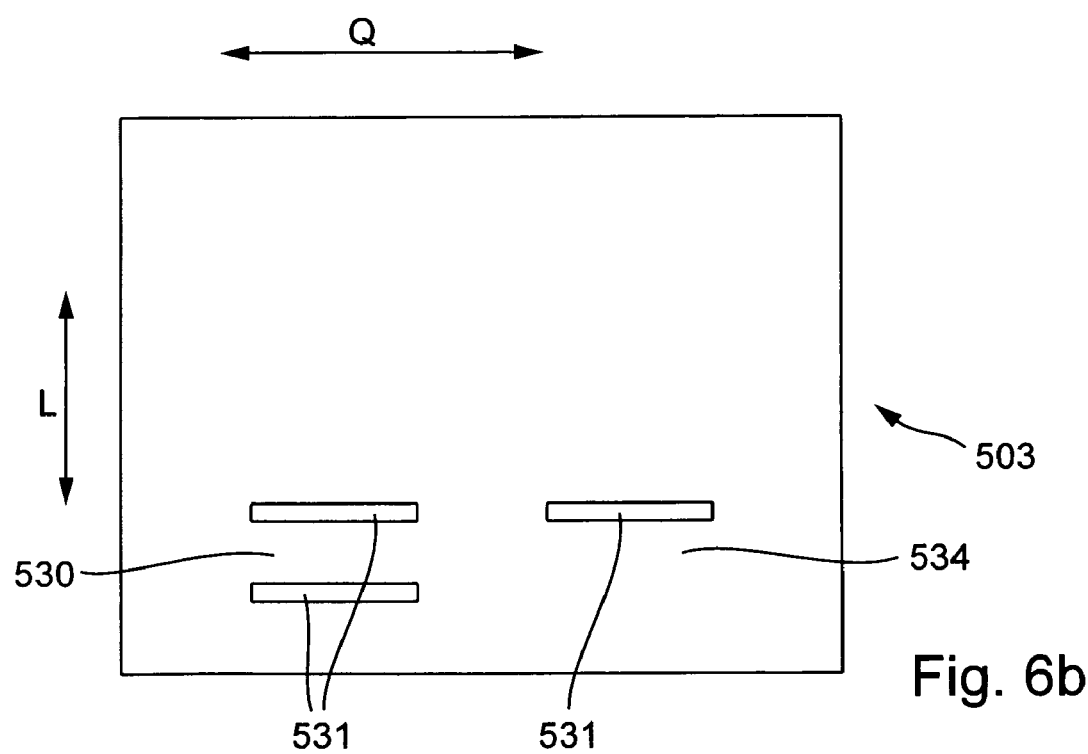

FIG. 6b shows a flexible sheet-like structure 503 with tabs 530, 534 by means of which the flexible sheet-like structure 503 can be fastened on the winding shaft 502 according to FIG. 6a. In the exemplary embodiment illustrated, a first tab 530 is formed by two slots 531 running in the transverse direction Q. The nose 521 of the winding shaft 502 illustrated in FIG. 6a can be guided through the slots 531 when the flexible sheet-like structure 503 is fitted on the winding shaft 502, in which case the tab 530 is inserted into the aperture 520. An edge of the nose 521 here ends up located beneath the flexible sheet-like structure 503. Even when the sheet-like structure is unwound to the full extent, the edge thus does not project, and this does away with the risk of injury and/or the risk of damage. It is likewise conceivable for a tab for the aperture 520 to be formed by just one slot 531, the edge of the nose 521 ending up located above the corresponding region of the flexible sheet-like structure. It should be noted that there is also minimal risk of injury here on account of the conventional arrangement of a winding shaft. Such a tab 534 is illustrated schematically in FIG. 6b for connection to the nose 525 according to FIG. 6a. The tab 534 is formed by just one slot 531 in the transverse direction Q. The nose 525 ends up located above the flexible sheet-like structure 503, in which case the flexible sheet-like structure 503 is fastened on the winding shaft 502 according to FIG. 6a. It would, of course, also be conceivable for flexible sheet-like structures 503 to be fastened conversely on the winding shaft 502, the nose 525 being inserted into two slots 531. The apertures 520, 524 and the corresponding tabs 530, 531 secure the flexible sheet-like structure 503 on the winding shaft 502 against being pulled off in one direction. In other configurations, the apertures 520, 524 may be arranged in opposite directions for a securing action in both directions.

Figure 7:
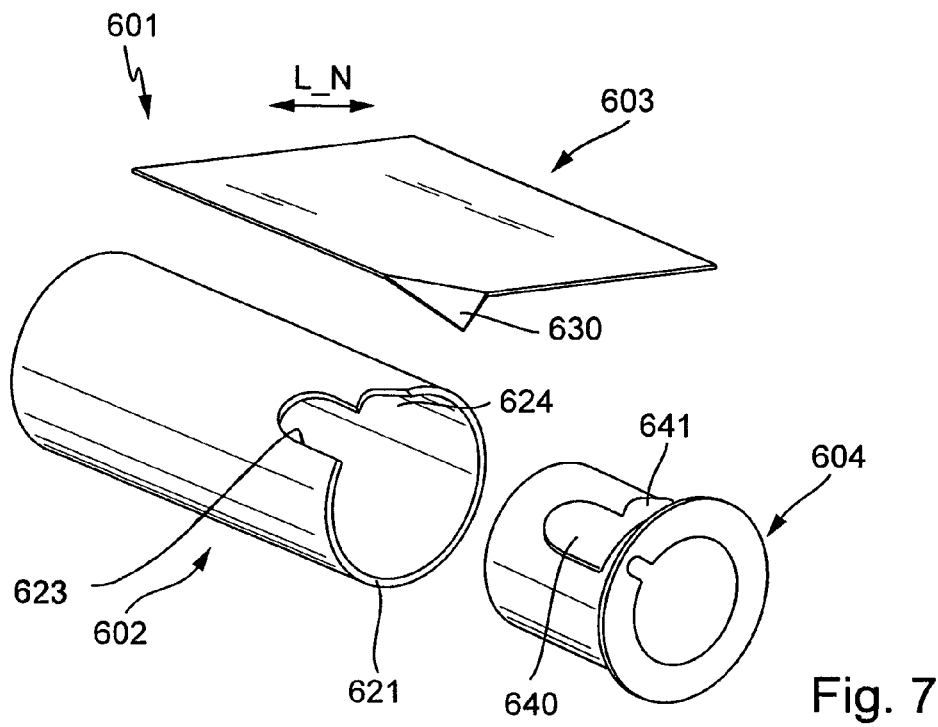
FIG. 7 shows an exploded illustration of a winding shaft, a flexible sheet-like structure and a bushing for a roller blind according to a seventh exemplary embodiment of the invention.

FIG. 7 shows an exploded illustration of an end region of a winding shaft 602 and of a flexible sheet-like structure 603 as well as a bearing bushing 604 for a roller blind 601 according to a seventh exemplary embodiment of the invention. The winding shaft 602 has an aperture 624 at its end 621. In order to produce a tab 630, a corner of the flexible sheet-like structure 603 has been folded over. The tab 630 can be inserted into the aperture 624 of the winding shaft 602 and fixed there by way of the bushing 604. The aperture 624, for this purpose, has an oblique flank, of which the angle corresponds essentially to a folding angle for folding the tab 630.

The winding shaft 602 has a groove 623 by means of which the bearing bushing 604 can be connected to the winding shaft 602 in a rotationally fixed manner when it is inserted into the end 621 of the winding shaft 602. In the exemplary embodiment illustrated, the aperture 624 follows the groove 623 directly in the circumferential direction. A tongue 640 and a latching nose 641 are formed on the bearing bushing 604 and are introduced into the groove 623 and the aperture 624, respectively. The tongue 640 here serves for connecting the bearing bushing 604 to the winding shaft 602 in a rotationally fixed manner. The latching nose 641 serves for clamping the flexible sheet-like structure 603 on the winding shaft 602.

Figure 8:
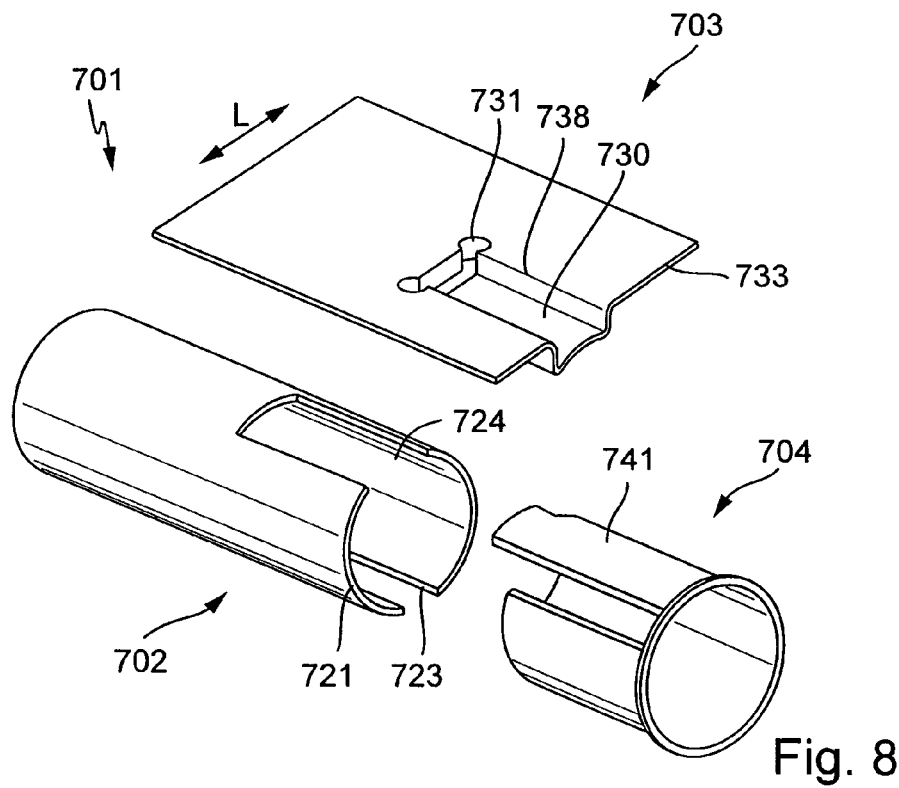
FIG. 8 shows an exploded illustration of a winding shaft, a flexible sheet-like structure and a bushing for a roller blind according to an eighth exemplary embodiment of the invention.

FIG. 8 shows an exploded illustration of part of a winding shaft 702 and of a flexible sheet-like structure 703 and also a bearing bushing 704 of a roller blind 701 according to an eighth exemplary embodiment. The flexible sheet-like structure 703 has a through-passage 731 extending in a longitudinal direction L and, in the exemplary embodiment illustrated, the through-passage 731 is configured essentially as a cut in the longitudinal direction L, the intention being for tearing to be prevented by circular widening at the ends of the cut. The flexible sheet-like structure 703 corresponds essentially to the sheet-like structure 303 according to FIG. 4b. As with this sheet-like structure 303, it is also the case here that, between the through-passage 731 and a lateral periphery 733 of the flexible sheet-like structure 703, a tab 730 can be angled about folding lines 738 in relation to the plane of the sheet-like structure 703. The tab 730 can be inserted into a complementary aperture 724 of the winding shaft 702. For fixing the tab 730 in the aperture 724, in the exemplary embodiment according to FIG. 8, the bearing bushing 704 is provided with a latching nose 741 which, when the bearing bushing 704 is pushed into the end 721 of the winding shaft 702, is pushed over the tab 730 inserted into the aperture 724. In other words, the latching nose 704 and the flexible sheet-like structure are "intertwined" with one another. The flexible sheet-like structure 703 is thus clamped to the winding shaft 702. An aperture 724 and tab 730 may be provided correspondingly at the opposite end (not illustrated) of the winding shaft 702 and of the flexible sheet-like structure 703. In order to connect the bearing bushing 704 to the winding shaft 702 in a rotationally fixed manner, a groove 723 is provided on the winding shaft 702 and a complementary tongue 740 is provided on the bearing bushing 704.

Of course, although only flexible sheet-like structures with a rectangular basic shape have been illustrated, other shapes, for example a trapezoidal shape or the like, are also conceivable. According to the invention, it is also possible, in the case of these shapes, for tabs to be formed in the basic flexible sheet-like structure, using corresponding cuts without any (additional) waste.

Furthermore, it is conceivable to produce cuts at any desired angle in order to form the tab in a sheet-like structure, an associated winding shaft having correspondingly angled slots.

The cuts may be formed, at their ends, with transverse slots which prevent the flexible sheet-like structure from tearing beyond the cut.

The cuts can be produced in canvases or similar sheet-like structures using knives, scissors or the like. It is also conceivable for the "cuts" to have already been provided in woven and/or plaited or braided sheet-like structures during production, it being possible for the cuts to have corresponding borders which prevent undesired tearing.

The invention claimed is:

1. A method of fastening a flexible sheet-like structure on a tubular winding shaft defining a longitudinal axis, said method comprising the steps of:
    forming first and second longitudinally-spaced apart and discrete apertures in the winding shaft only in respective opposite ends thereof so as to pass through a wall of the winding shaft and so that a width of each of the first and second apertures is greater than a thickness of the sheet-like structure, the respective opposite ends of the winding shaft being open;
    forming first and second angularly positionable tabs on the sheet-like structure only adjacent respective opposite sides thereof;
    inserting the first and second tabs of the winding shaft into the respective first and second apertures; and
    fixing the sheet-like structure on the winding shaft by inserting bearing bushings into the respective open ends of the winding shaft such that the bearing bushings directly engage the respective first and second tabs and fix the sheet-like structure on the winding shaft.

2. The method of claim 1, wherein the bearing bushings each define a latching nose thereon, and said step of fixing the sheet-like structure on the winding shaft comprises contactingly engaging the latching noses with the respective first and second tabs and clamping the sheet-like structure to the winding shaft.

3. The method of claim 1, wherein said step of forming the first and second tabs comprises one of: cutting into the sheet-like structure adjacent the respective opposite sides thereof; and deforming the sheet-like structure adjacent the respective opposite sides thereof.

4. The method of claim 1, wherein said step of forming the first and second apertures comprises forming respective cutout areas in the winding shaft which open sidewardly in the direction of the axis at the respective opposite ends of the winding shaft.

5. A roller blind for fitting in a motor vehicle comprising:
    a tubular winding shaft defining a longitudinal axis and defining therein first and second discrete apertures disposed in longitudinally spaced-apart relation with one another adjacent respective opposite ends of said winding shaft, said ends of said winding shaft opening axially sidewardly;
    a sheet-like structure fastened to said winding shaft so that said sheet-like structure can be wound up on said winding shaft and unwound from said winding shaft, said sheet-like structure having a pair of spaced-apart edges disposed adjacent the respective opposite ends of said winding shaft, and first and second angularly positionable tabs disposed adjacent the respective said edges of said sheet-like structure, said first and second tabs being engaged within the respective said first and second apertures of said winding shaft, and each said first and second aperture having a width which is greater than a thickness of said sheet-like structure; and
    a pair of bearing bushings disposed in the respective ends of said winding shaft, each said bearing bushing having a portion which directly contactingly engages the respective tab to fix said sheet-like structure to said winding shaft.

6. The roller blind of claim 5, wherein said first and second apertures are disposed only in respective opposite ends of said winding shaft, and said first and second tabs are disposed only adjacent the respective edges of said sheet-like structure.

7. The roller blind of claim 5, wherein said first and second tabs comprise respective first and second deformations of said sheet-like structure disposed adjacent the respective edges thereof.

8. A roller blind for fitting in a motor vehicle comprising:
    a sheet-like structure defining a pair of angularly positionable tabs disposed adjacent respective opposite edges of said sheet-like structure;
    an elongate winding shaft having a pair of longitudinally spaced-apart open ends and defining a pair of apertures adjacent the respective said open ends, each said aperture having a width greater than a thickness of said sheet-like structure and said tabs of said sheet-like structure being disposed within the respective said apertures; and
    a pair of bearing bushings disposed within the respective said open ends of said winding shaft, each said bearing bushing having a portion which directly contactingly engages the respective said tab of said sheet-like structure to fix said sheet-like structure to said winding shaft so that said sheet-like structure can be wound up on said winding shaft and unwound from said winding shaft.

9. A roller blind for fitting in a motor vehicle comprising:
    a sheet-like structure defining an angularly positionable tab thereon;
    an elongate winding shaft having an open end and defining an aperture adjacent said open end, said aperture having a width greater than a thickness of said sheet-like structure and said tab of said sheet-like structure being disposed within said aperture; and
    a bearing bushing disposed within said open end of said winding shaft and having a latching nose which directly contactingly engages said tab of said sheet-like structure and clamps said sheet-like structure to said winding shaft so that said sheet-like structure can be wound up on said winding shaft and unwound from said winding shaft.

10. The roller blind of claim 9, wherein said tab comprises a folded-over corner of said sheet-like structure and is folded over an edge of said winding shaft which defines said aperture, and said latching nose is disposed within said aperture to engage said tab and clamp said sheet-like structure to said winding shaft.

11. The roller blind of claim 9, wherein said tab comprises a portion of said sheet-like structure which projects inwardly into said aperture of said winding shaft, and said latching nose is engaged with and disposed over said tab in superimposed relation therewith to clamp said sheet-like structure to said winding shaft.

* * * * *